US006926342B2

(12) United States Patent
Pommeret et al.

(10) Patent No.: US 6,926,342 B2
(45) Date of Patent: Aug. 9, 2005

(54) MECHANISM FOR GUIDING A SLIDING DOOR, A SLIDING DOOR, AND A MOTOR VEHICLE PROVIDED WITH SUCH A MECHANISM

(75) Inventors: Maelig Pommeret, Lyons (FR); Gerald Andre, Amberieu en Bugey (FR)

(73) Assignee: Compagnie Plastic Omnium, Lyons (FR)

( * ) Notice: Subject to any disclaimer, the term of this patent is extended or adjusted under 35 U.S.C. 154(b) by 118 days.

(21) Appl. No.: 10/446,837

(22) Filed: May 29, 2003

(65) Prior Publication Data

US 2004/0108749 A1 Jun. 10, 2004

(30) Foreign Application Priority Data

May 30, 2002 (FR) ........................................... 02 06661

(51) Int. Cl.$^{7}$ ............................ B60J 5/06; E05D 15/58
(52) U.S. Cl. .................... 296/155; 296/146.12; 49/223
(58) Field of Search ........................... 296/155, 146.11, 296/146.12; 49/209, 218, 219, 221, 223, 225, 254

(56) References Cited

U.S. PATENT DOCUMENTS 3,051,999 A 9/1962 Schimek
3,318,048 A * 5/1967 Odend'Hal .................. 49/223
3,935,674 A * 2/1976 Williams et al. .............. 49/212
4,135,760 A * 1/1979 Grossbach .................. 296/155
4,268,996 A * 5/1981 Allen .......................... 49/212
5,921,613 A * 7/1999 Breunig et al. ............. 296/155
6,183,039 B1 * 2/2001 Kohut et al. ................ 296/155
6,386,621 B1 * 5/2002 Kozak et al. ............... 296/155
6,477,806 B1 * 11/2002 Asada et al. .................. 49/169
6,685,253 B1 * 2/2004 Wolcott ...................... 296/155

FOREIGN PATENT DOCUMENTS

FR 2 814 489 A1 3/2002

* cited by examiner

*Primary Examiner*—D. Glenn Dayoan
*Assistant Examiner*—Greg Blankenship
(74) *Attorney, Agent, or Firm*—Oliff & Berridge, PLC

(57) ABSTRACT

The invention provides a mechanism for guiding a sliding door of a motor vehicle. The mechanism comprises a rail, a slider movable in the rail, and an arm connected to the slider and connecting the door to the vehicle via the rail. In the mechanism, the rail is arranged to be mounted on the door while the arm is arranged to be mounted on the vehicle. The invention also provides a sliding door and a motor vehicle provided with such a mechanism.

10 Claims, 4 Drawing Sheets

Fig. 2a
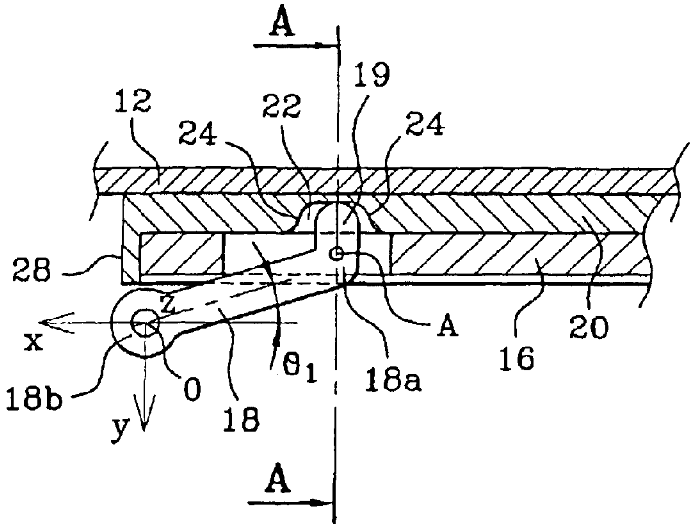
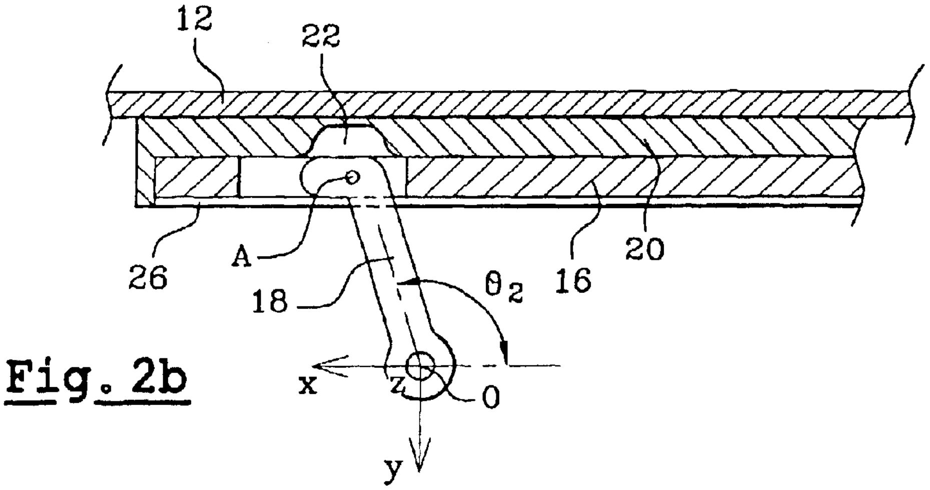
Fig. 2b
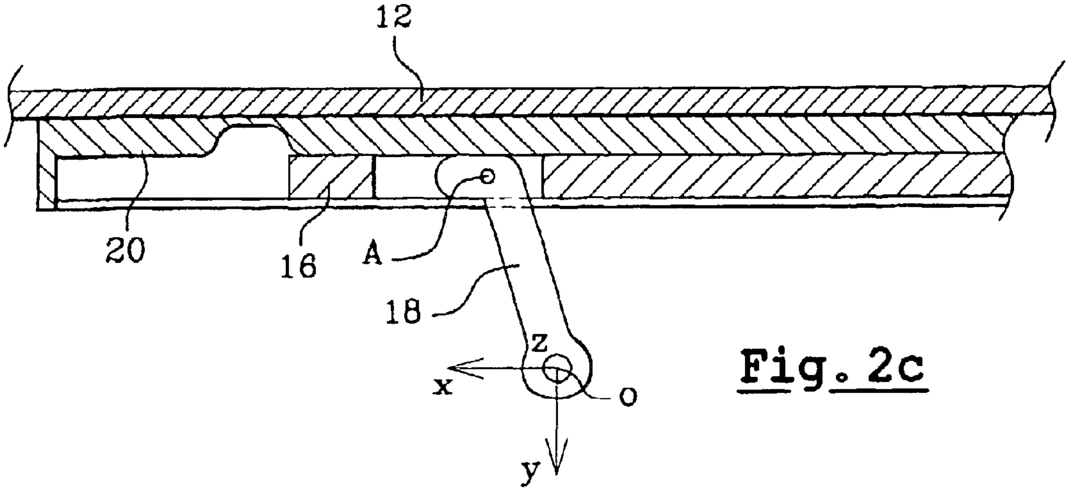
Fig. 2c

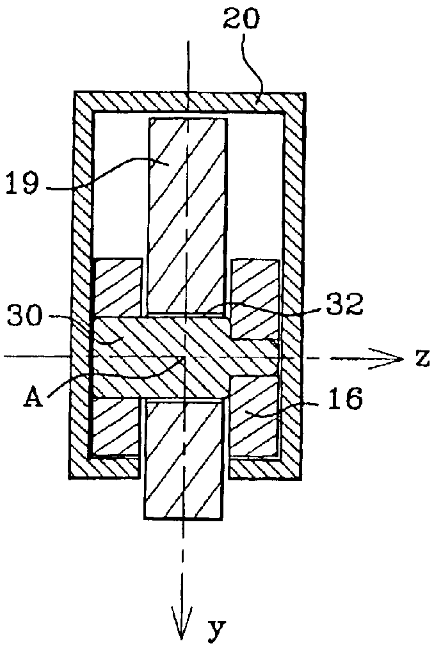
Fig. 3
SECTION A-A
Fig. 4a
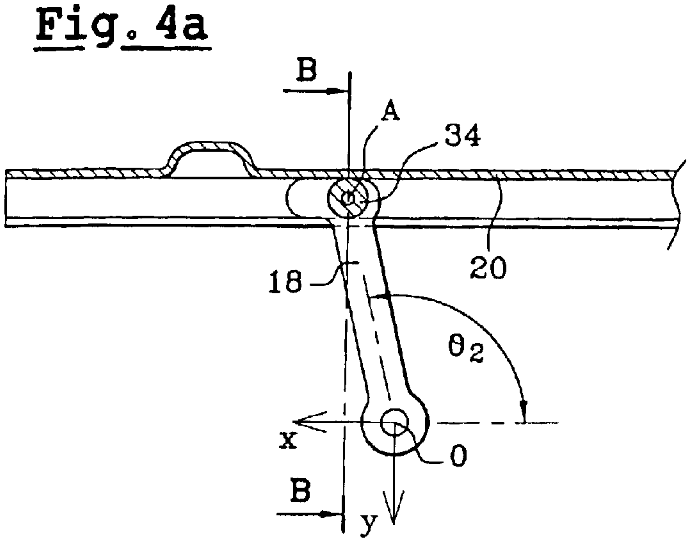
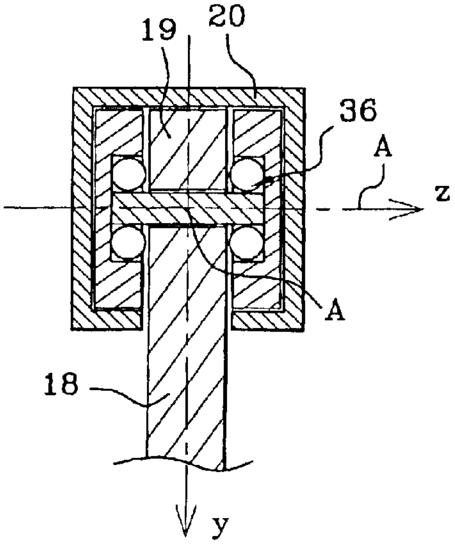
Fig. 4b
SECTION B-B

Fig. 5
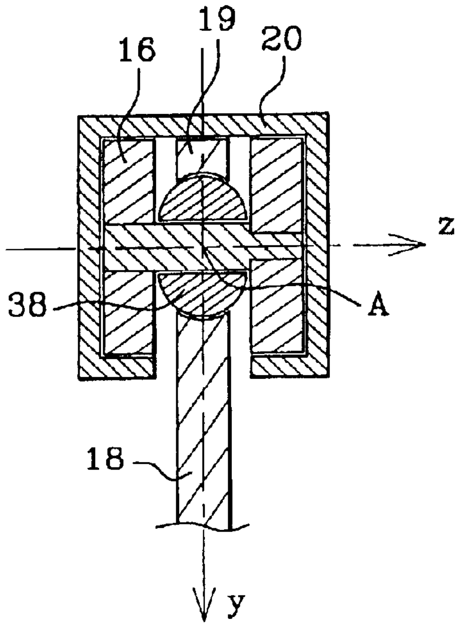
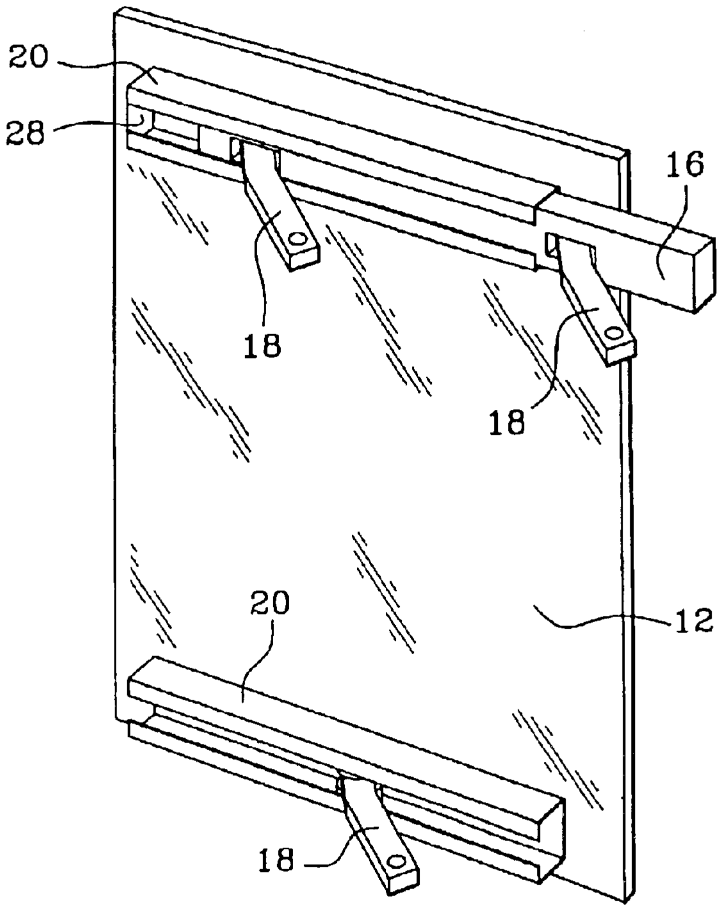
Fig. 6

MECHANISM FOR GUIDING A SLIDING DOOR, A SLIDING DOOR, AND A MOTOR VEHICLE PROVIDED WITH SUCH A MECHANISM

The present invention relates to a mechanism for guiding a sliding door of a motor vehicle, to such a sliding door, and to a motor vehicle provided with such a mechanism.

BACKGROUND OF THE INVENTION

In general, the means for guiding a sliding door comprise a rail that is visible on the bodywork outside the motor vehicle, with the sliding door moving along the rail when it is opened or closed.

Such a rail spoils the appearance of the vehicle and does not leave total freedom in design, in particular because the vehicle body which serves to support the rail must extend at least along the full length of the rail. This requires the frame of the sliding door to be positioned at a distance from the end of the vehicle that is not less than the width of the door itself.

OBJECTS AND SUMMARY OF THE INVENTION

The invention seeks to remedy those drawbacks by proposing a mechanism for guiding a sliding door that is both more discrete and less constraining as to where the sliding door can be located on the vehicle.

The present invention provides a mechanism for guiding a motor vehicle sliding door, the mechanism comprising a rail, a slider movable in the rail, and an arm secured to the slider, connecting the door to the vehicle via the rail, wherein the rail is arranged to be mounted on the door while the arm is arranged to be mounted on the vehicle.

Thus, the rail carried by the inside face of the door is hidden behind the door and is not visible when the door is closed.

The guide mechanism of the invention may further comprise one or more of the following characteristics:

- the arm is a link having one end pivotally mounted on the slider;
- the link, the slider, and the rail are arranged so that while the door is being opened, the link turns about its end fixed to the slider, prior to the slider sliding in the rail;
- the arm is a link whose second end is pivotally mounted to the remainder of the motor vehicle, in particular to the doorframe;
- the link has a projection at its first end, the projection projecting from the slider while the sliding door is closed, and the rail includes a localized notch in which the projection of the link is received when it projects beyond the slider;
- the projection is generally oblong in shape;
- the rail is closed at least one of its ends by a wall serving as an end-of-stroke abutment for the slider, and the projection is in register with the notch when the slider is in contact with the wall; and
- the rail has an external rim against which the oblong projection of the link comes into abutment when the sliding door of the motor vehicle is in its open position, the projection of the link then being fully integrated in the slider.

The invention also provides a sliding door for a motor vehicle fitted with guide means as described above, and it also provides a motor vehicle fitted with such a sliding door.

BRIEF DESCRIPTION OF THE DRAWINGS

The invention will be better understood from the following description given purely by way of example and made with reference to the accompanying drawings, in which:

FIGS. 2*a*, 2*b*, and 2*c* are section views seen from above of a guide mechanism and a sliding door of the motor vehicle shown in FIG. 1;

FIG. 3 shows a detail of the guide mechanism in a first embodiment;

FIGS. 4*a* and 4*b* show a detail of the guide mechanism in a second embodiment;

FIG. 5 shows a detail of the guide mechanism in a third embodiment; and

FIG. 6 is a perspective view of a sliding door of the motor vehicle of FIG. 1.

MORE DETAILED DESCRIPTION

Figure 1:
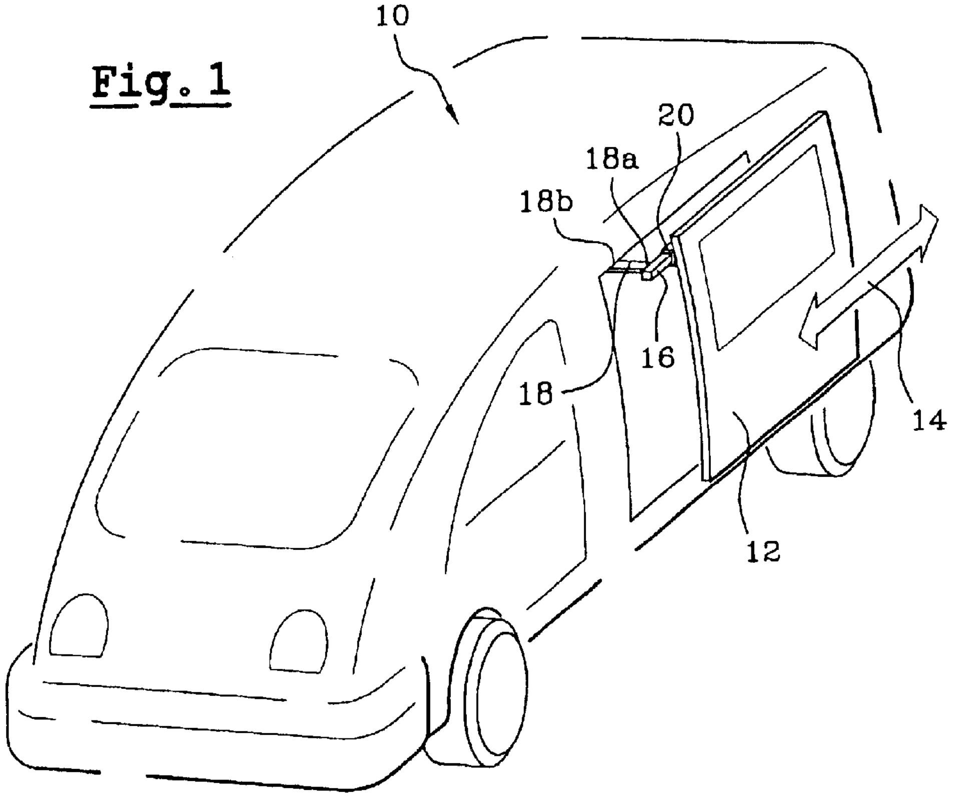
FIG. 1 is a diagrammatic perspective view of a motor vehicle in accordance with the invention.

The motor vehicle 10 shown in FIG. 1 has a sliding door 12 capable of moving in the direction of arrow 14 along the motor vehicle while the door is being opened or closed.

The sliding door 12 moves along the motor vehicle 10 under guidance from a guide mechanism comprising a slider 16 connected via a pivot axis to a first end 18*a* of a link 18 fixing the sliding door 12 to the motor vehicle 10, and a rail 20 fixed to the sliding door 12. The slider 16 slides inside the rail 20 which is hollow.

The slider 16 is constituted by a bar of rectangular section, sliding inside the hollow rail 20 of complementary inside section.

A second end 18*b* of the link 18 is pivotally mounted to the remainder of the vehicle, for example it is fixed to the doorframe.

The assembly constituted in this way forms a guide mechanism shown in greater detail in FIGS. 2*a*, 2*b*, and 2*c* where it is shown in horizontal section as seen from above.

In FIG. 2*a*, the mechanism is shown with the sliding door 12 in its closed position. In FIG. 2*b* the sliding door 12 is in an intermediate position; and in FIG. 2*c* the sliding door 12 is in its open position.

In FIG. 2*a*, the pivot connection between the link 18 and the doorframe is represented by a point O. The link is mounted at said point O to pivot freely about a vertical axis (Oz).

The first end 18*a* of the link 18 is fixed at a point A to the slider 16. At this point A, it is free to pivot about a vertical axis (Az).

At its first end 18*a*, the link 18 has a projection 19 of generally oblong shape, and of longitudinal axis that is substantially parallel to the axis (Oy) when the door 12 is closed. The main axis (OA) of the link 18 thus forms an angle $\theta_1$ with the longitudinal axis of the motor vehicle 10, referred to as the axis (Ox).

The rail 20 is closed at each end by an end wall 28 serving as an end-of-stroke abutment for the slider 16.

The overall size of the guide mechanism for the sliding door 12 becomes smaller with decreasing angle $\theta_1$. In this position, a portion of the link 18 becomes integrated in the slider 16, while its oblong projection 19 projects therefrom.

For this purpose, a thick wall of the rail 20 includes locally a zone 22 of smaller thickness forming a notch which receives the oblong projection 19 of the link 18 that projects from the slider 16.

The side walls 24 of the notch 22 form abutments between which the projection 19 is retained. This has the effect of preventing any movement in translation of the slider 16 relative to the rail 20 so long as the oblong projection 19 of the link 18 extends beyond the rail 16.

Thus, when it is desired to open the sliding door 12, any sliding movement along the axis (Ox) is initially prevented. Only pivoting movement of the link 18 about the axis (Oz) is possible, which has the effect of moving the sliding door 12 away from the remainder of the vehicle 10.

In this position, in which the oblong projection 19 is in register with the notch 22, the slider 16 is in contact with the wall 28 of the rail 20.

After the link 18 has pivoted, the assembly is in an intermediate position as shown in FIG. 2*b*.

In this position, the angle $\theta_2$ formed between the axis (OA) of the link and the longitudinal axis (Ox) is substantially equal to $\theta_1+\pi_2$. In this intermediate position, the oblong projection 19 of the link 18 is fully received in the slider 16, their respective axes coinciding, such that it no longer bears against either of the abutments 24 of the notch 22 in the rail 20. Pivoting of the link about the axis (Oz) is limited to this limiting value $\theta_2$ because the oblong projection 19 then comes into abutment against the outside edge 26 of the rail 20. The slider 16 is then free to slide inside the rail 20.

Thus, with continued opening of the sliding door 12, the door moves in translation parallel to the axis (Ox) so as to reach a position as shown in FIG. 2*c*.

In this figure, the link 18 is still at an angle $\theta_1$ with the axis (Ox) and the slider 16 has moved in translation inside the rail 20.

While the sliding door 12 is being opened, the movement of the door is subdivided into two periods. In an initial period, between the closed position and the intermediate position of the door 12, only pivoting about the axis (Oz) of the link 18 is allowed, thereby causing the door 12 to be moved away from the remainder of the vehicle 10. Thereafter, during a second period, between the intermediate position and the open position of the door 12, the oblong projection 19 of the link 18 is fully received in the slider 16 and comes into abutment against the rim 26. As a result, pivoting of the link 18 is no longer allowed, and the only movement that is allowed to the sliding door 12 is movement in translation with the slider 16 moving relative to the rail 20.

Conversely, while the sliding door 12 is being closed, the oblong projection 19 of the link 18 begins by providing the sliding door 12 with guidance in the Y direction and in the Z direction. Thereafter, once said oblong end 19 is in position level with the notch 22, the slider 16 comes into abutment against the wall 28 of the complementary rail 20 in the intermediate position shown in FIG. 2*b*. This abutment of the slider 16 against the wall 28 serves to prevent any further movement in translation, such that the only movement allowed is pivoting of the link 18 about the axis (Oz) which has the effect of moving the sliding door 12 towards the remainder of the vehicle 10 and of closing the door.

FIG. 3 shows a detail of the way the link 18 is mounted, in section on the plane specific in FIG. 2*a*.

In this embodiment, the link 18 is mounted to pivot inside a recess of the slider 16 about a pin 30 passing through said recess along the axis (Az).

A second embodiment is shown in FIGS. 4*a* and 4*b*.

In FIG. 4*a*, it can be seen that the bar forming the slider 16 can be replaced by a wheel 34 that provides guidance in the Z direction only for displacement of the door 12. This wheel is fixed to the oblong projection 19 of the link by means of a conventional type of ball bearing system 36 shown in FIG. 4*b*.

In a third embodiment, shown in FIG. 5, the link 18 is mounted about the pin 30 by means of a ball-and-socket joint 38 allowing rotation about the axis (Ox) of the link. This makes it possible, for reasons of style or compactness, to tilt the door 12 relative to the vehicle (Oz) while the door is being opened.

Finally, as shown in FIG. 6, different variants of the guide mechanism can be used for mounting the slider door 12 on the vehicle.

For example, in the top portion of the door, two links 18 are mounted on a slider 16 that slides inside a corresponding rail 20, as shown in FIG. 3.

In the bottom portion of the sliding door 12, a third link 18 is mounted in another rail 20' by means of a wheel, as shown in FIG. 4*b*. Guidance in the Y and Z directions is provided to the sliding door 12 while it is being opened by the links mounted on the top portion of the sliding door 12. There is therefore no need to provide the same device in the bottom portion of the sliding door 12.

It can clearly be seen that the means for fixing and guiding the sliding door 12 as described above enable it to be opened and closed while remaining hidden inside the motor vehicle when the sliding door 12 is closed.

Another advantage of the guide mechanism as described above is that it enables the movements performed by the sliding door 12 while it is being opened and closed to be broken down into pivoting about the axis (Oz) and moving in translation parallel to the axis (Ox).

Another advantage of the motor vehicle described above lies in the compactness of the system for opening and closing the sliding door 12 due to the pivoting of the fixing links 18, thus enabling them to come closer to the guide rails 16 and 20 when the sliding door 12 is closed.

Finally, another advantage of the invention is that the size of the opening that can be closed by the sliding door 12 does not depend on the length of the vehicle 10.

What is claimed is:

1. A guide mechanism for a sliding door of a motor vehicle, the mechanism comprising a rail, a slider movable in the rail, and a link having a first end pivotally mounted to the slider, connecting the door to the vehicle by means of the rail, the rail being arranged to be mounted on the door while the link is arranged to be mounted on the vehicle, wherein:

the link has a projection at the first end, the projection projecting from the slider while the sliding door is closed;

the rail includes a localized notch in which the projection of the link is received when the link projects beyond the slider;

the rail is closed at least one end by a wall serving as an end-of-stroke abutment for the slider; and the projection is in register with the notch when the slider is in contact with the wall.

2. A guide mechanism according to claim 1, wherein the link, the slider, and the rail are arranged so that while the door is being opened, pivoting of the link about the first end that is fixed to the slider precedes sliding of the slider in the rail.

3. A guide mechanism according to claim 1, wherein the link has a second end pivotally mounted to the remainder of the motor vehicle.

4. A guide mechanism according to claim 1, wherein the rail has an external rim against which the projection of the link comes into abutment when the sliding door of the motor vehicle is in an open position, the projection of the link then being fully integrated in the slider.

5. A sliding door for a motor vehicle, the door being provided with the guide mechanism according to claim 1.

6. A motor vehicle fitted with the sliding door according to claim 5.

7. A guide mechanism according to claim 1, wherein the link has a second end pivotally mounted to the door frame of the door.

8. A guide mechanism according to claim 7, wherein the projection is generally oblong in shape.

9. A guide mechanism for a sliding door of a motor vehicle, the mechanism comprising a rail, a slider movable in the rail, and a link having a first end pivotally mounted to the slider, connecting the door to the vehicle by means of the rail, the rail being arranged to be mounted on the door while the link is arranged to be mounted on the vehicle, wherein the rail has an external rim against which a projection of the link comes into abutment when the sliding door of the motor vehicle is in an open position, the projection of the link then being fully integrated in the slider.

10. A guide mechanism according to claim 9, wherein the link has means for preventing any movement in translation of the slider relative to the rail while it is possible for the link to pivot relative to the slider.

* * * * *